Figure 2:
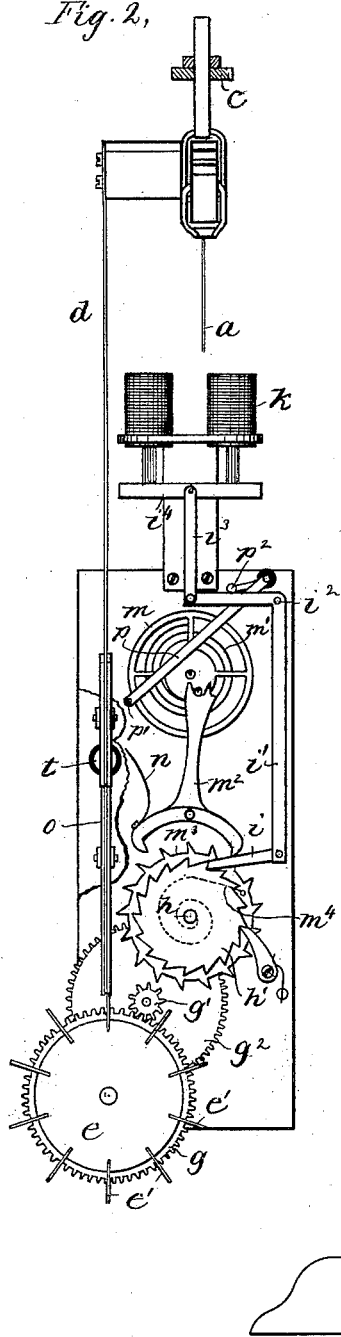

(No Model.) 2 Sheets—Sheet 1.

H. H. CUTLER.
ELECTRIC METER.

No. 397,538. Patented Feb. 12, 1889.

Witnesses.
Jas. J. Maloney
M. E. Hill

Inventor,
H. H. Cutler,
by Jos. P. Livermore
Att'y.

(No Model.) 2 Sheets—Sheet 2.

H. H. CUTLER.
ELECTRIC METER.

No. 397,538. Patented Feb. 12, 1889.

Witnesses,
Jas. J. Maloney
M. E. Hill

Inventor,
H. H. Cutler,
by Jos. P. Livermore
Att'y.

UNITED STATES PATENT OFFICE.

HENRY H. CUTLER, OF NEWTON, MASSACHUSETTS.

ELECTRIC METER.

SPECIFICATION forming part of Letters Patent No. 397,538, dated February 12, 1889.

Application filed June 25, 1888. Serial No. 278,096. (No model.)

*To all whom it may concern:*

Be it known that I, HENRY H. CUTLER, of Newton, county of Middlesex, and State of Massachusetts, have invented an Improvement in Electric Meters, of which the following description, in connection with the accompanying drawings, is a specification, like letters on the drawings representing like parts.

My invention relating to an electric meter is embodied in an apparatus comprising a device for measuring the quantity of current flowing through a conductor at any given time, and also for measuring the total quantity of current flowing into the time during which such current continues to flow in any desired interval of time.

The device employed for measuring the quantity of current consists, essentially, of two wires substantially similar to one another in diameter, length, and material, and subjected to equal tension in the direction of their length, one only of which wires is traversed by the current to be measured, and is thus heated and caused to expand by the current flowing through it, the amount of said expansion varying with the amount of the current. The said wires are connected with a pivoted yoke or lever provided with a pointer, which yoke is caused to rock on its pivot, producing a movement of the pointer as the length of one wire relative to the other changes. The pivot of the yoke is acted upon by a spring or equivalent that produces tension upon the wires, so that any expansion or contraction that is shared equally by both wires simply causes a bodily movement of the yoke without rocking the same on its pivot or producing angular movement of the pointer, which thus responds to only the difference in expansion produced by the current flowing through one wire. The pointer will thus assume different angular positions for different quantities of current flowing through the wire, and when used, for example, with a system of electric lamps supplied by the current passing through the meter from a main circuit capable of supplying a large number of lamps the said pointer will assume different positions for each different number of lamps that may be in operation in the supplied circuit.

In order to indicate the product of the quantity of current into the time during which the current is used, or, in other words, to measure the aggregate amount of current used in a given period of time, the said pointer co-operates with a time-motor or clock and with an indicating-train of wheel-work so arranged that the number of movements of the indicating-train during a given period of time depends on the position of the pointer, and is proportional to the current at that time indicated by the pointer. Assuming, for example, that the part of the clock-motor that causes the indicating-train to be moved rotates once in six minutes, it will, if one lamp be lighted and a corresponding current be flowing, produce one movement of the indicating-train of wheel-work at each six minutes. If two lamps be lighted, it will produce two movements in each six minutes; if three lamps, three movements, and so on, so that the said indicating-train will at the end of any given period show the total product of the number of lamps that have been operated into the time that they have been operated.

The clock-movement is shown as actuated by the current and arranged to run only while the current is flowing, means being provided for automatically starting the clock when the pointer moves to indicate the smallest amount of current that is used and to stop the clock when the current wholly ceases in the supplied circuit.

Figure 1:
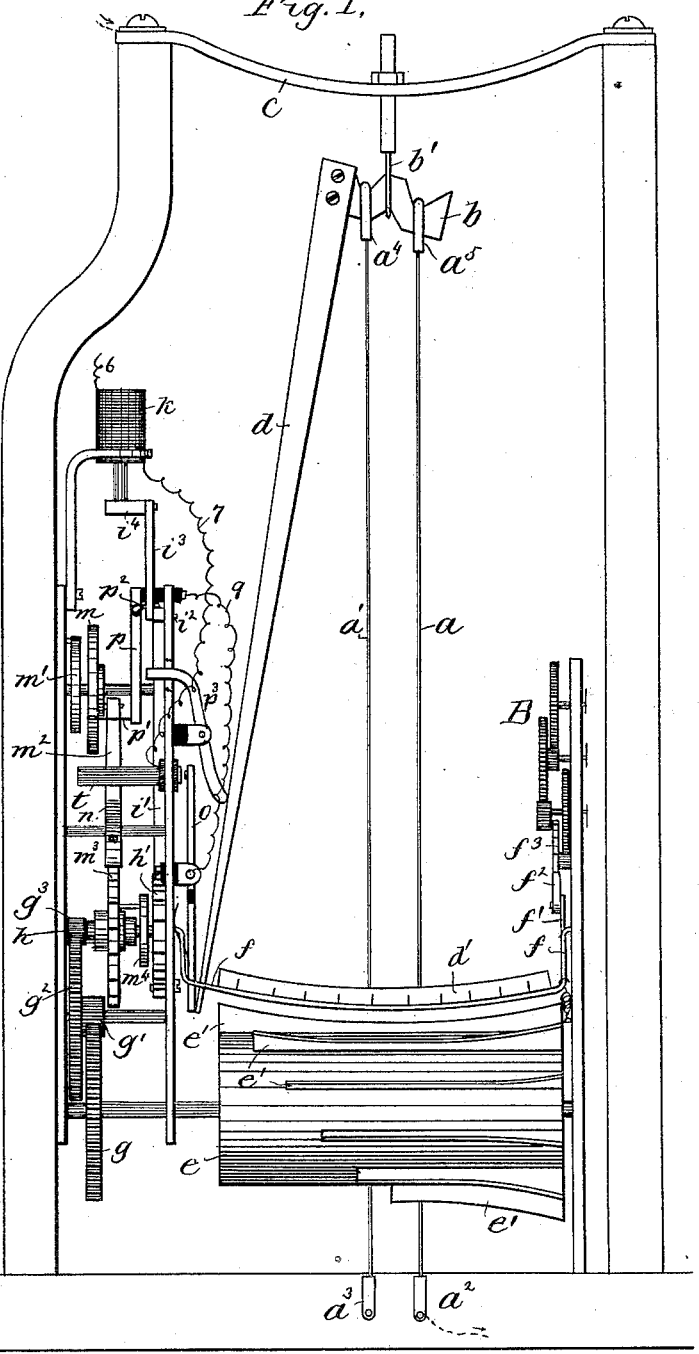
Figure 3:
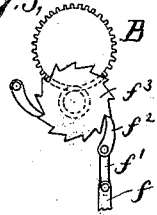
Figure 4:
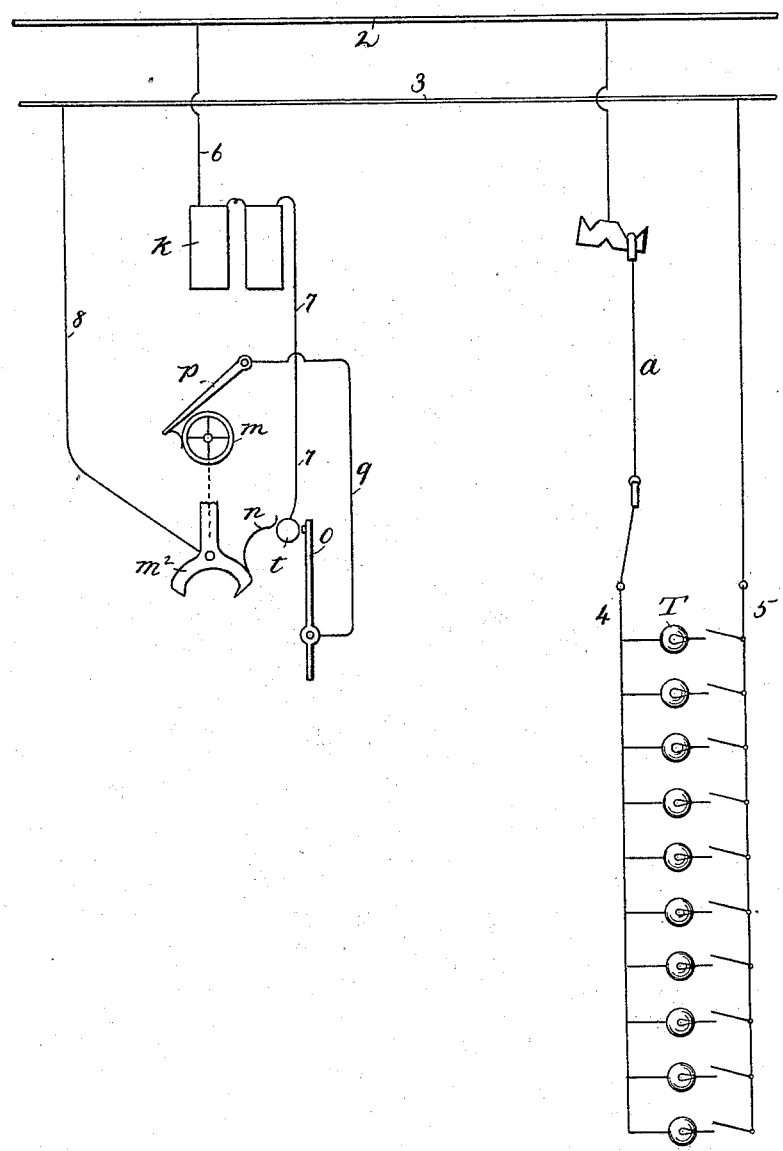

Figure 1 is a front elevation of an electric meter embodying this invention; Fig. 2, a side elevation of the time-motor or clock with one of the frame-plates removed to show the working parts; Fig. 3, a detail to be referred to, and Fig. 4 a diagram representing the circuit-connections.

The current-indicator is composed of two similar wires, $a$ $a'$, each fastened at one end, as shown at $a^2$ $a^3$, to the rigid frame-work A, and being stretched from their points of attachment to a yoke or lever, $b$, with which each is connected, as by a stirrup or similar device, $a^4$ $a^5$, the said yoke or lever $b$ being itself pivoted upon a stirrup, $b'$, acted upon by a tension device, shown as a spring, $c$, which tends to stretch both wires $a$ $a'$ and subjects them to equal tension. The wires $a\ a'$ are insulated from one another at their lower points of attachment, $a^2\ a^3$, and are preferably composed of German silver, as that is sensitive to the action of an electric current passing through it; and as the wires are of substantially equal length and subjected to substantially the same external conditions it is obvious that any expansion or contraction shared in by both wires equally will simply produce a bodily movement of the lever $b$ without turning it on its fulcrum, such expansion and contraction being accommodated by the yielding of the tension device $c$. Consequently changes in temperature due to external influences will produce no rocking movement of the lever $b$.

Any expansion or contraction, on the other hand, of one of the wires that is not shared in by the other wire will cause a rocking movement of the lever $b$, which is provided with a long pointer, $d$, that has the same angular movement as the lever $b$, so that its extremity indicates a relative change in the lengths of the wires $a\ a'$, but on a much larger scale, the indication being multiplied in the proportion of the length of the pointer $d$ to the distance between the points of attachment of the wires $a\ a'$ with the lever $b$.

One of the wires, as $a$, is interposed in circuit (see Fig. 4) between the main or supplying conductors and the translating devices to which the current is supplied from said main conductors, and is consequently traversed by all the current consumed by the translating devices, the said wire being heated and expanded by the said current in the well-known manner, and the amount of expansion varying with the quantity of the current in a ratio that can readily be determined by experiment, it being sufficient for purposes of comparative measurement that the positions of the pointer for different known currents be once observed and marked, after which the current at any time flowing will be known by the position of the pointer. Such a graduated scale for the pointer is represented at $d'$, being shown as supported on a swinging frame, the purposes of which will be hereinafter explained. When, as is usually the case, a current of substantially-constant electro-motive force is employed to operate a greater or less number of translating devices arranged in multiple arc, the pointer $d$ will move by successive steps as the number of translating devices is varied, and for convenience in description and illustration the instrument is represented as indicating for any number from one to ten of translating devices—such, for example, as incandescent lamps.

In order to indicate the total product of the translating devices into their time of operation, the said pointer $d$ is arranged to act as an intermediate device between an indicating-train of wheel-work, B, and a time-measuring actuator, $e$, for said train in such manner that the amount of movement of the train B during any given period of movement of the actuator $e$ will vary according to the position of the pointer $d$, and consequently in accordance with the number of translating devices that are in operation during such period.

A time-motor or clock by which the actuator $e$ is propelled will be hereinafter described, it being sufficient for the understanding of the operation of the indicating devices next to be described to know that the said actuator $e$, which is in the form of a drum, has a rotary movement of substantially-uniform speed while any of the translating devices are in operation, and it may or may not also continue to run while the said translating devices are not in operation. The said drum $e$ is arranged below the pointer $d$, so that the end of the latter in its movement passes from end to end of the said drum, which is provided with a number of projecting plates or wings, $e'$, of different length, as clearly shown in Fig. 1, the said plates all extending from one end of the drum, but terminating at different distances from the other end of the drum, one only extending the entire length of the drum.

The pointer $d$ is made thin and flexible, so that it can be easily sprung some distance in the direction at right angles to the plane in which it is moved by the lever $b$, for the purpose of indicating the quantity of current, which sidewise or lateral movement will not change its angular or current-indicating position. When no current is flowing and both wires $a\ a'$ are exposed only to external conditions, the pointer will be in the position shown in Fig. 1 and wholly at one side of the drum $e$. When one translating device is thrown into circuit, the corresponding movement of the pointer $d$ will bring it over the adjacent end of the drum $e$, in position to be struck by the one plate $e'$, that extends the entire length of the drum, so that the said pointer $d$ will be sprung aside or moved laterally once at each rotation of the drum.

If two translating devices are set in operation, the pointer will move a step farther along the drum, so that the next shorter plate $e'$ will also strike it, thus producing two lateral movements at each rotation of the drum, and so on. For each additional translating device set in operation the pointer will receive an additional lateral movement during each rotation of the drum, and, as an example, if five translating devices are operating, the pointer will receive the same number of lateral movements in one rotation of the drum that it would in five rotations if one translating device only were in operation. The number of movements of the pointer is therefore equal to the sum of the number of lamps in operation during each rotation of the drum $e$. This number of movements is indicated on the train B, which may be like the indicating-train of any meter, by the following mechanism:

The end of the pointer $d$ rests at one side of the swinging frame $f$, so that each lateral movement of said pointer produced by one of the plates of the drum produces a corresponding swinging movement of the said frame, which extends across the entire traverse of the pointer, so as to be operated by it in whatever position it may be. The said frame $f$ has an arm, $f'$, provided with a pawl, $f^2$, engaging a ratchet, $f^3$, on the first arbor of the train B, (see Fig. 3,) so that it advances the said ratchet one tooth or step at each swinging movement of the frame corresponding to a lateral movement of the pointer $d$, and the total number of these step advances (which will be indicated by the train of wheel-work in the usual manner) thus indicates the total number of lateral movements of the pointer $d$, which springs back to its original position after each plate passes it and before the next plate engages it.

So far as the operation of the actuating-drum $e$ and indicating-train B is concerned, the pointer $d$ might be moved angularly by other means than the wires $a\ a'$, it being only necessary that it should be moved to the different angular positions corresponding to different quantities of current in use. The clock or time-motor by which the drum $e$ is driven is shown in this instance as actuated by the current, and consists, essentially, of a train of wheel-work, $g\ g'\ g^2\ g^3$, the pinion $g^3$ of which is on a shaft, $h$, having connected with it a ratchet, $h'$, as best shown in Fig. 2. This train of wheel-work causes the drum $e$ to be moved much more slowly than the ratchet $h'$, which is actuated with a step-by-step movement by a pawl, $i$, carried by a lever, $i'$, pivoted at $i^2$, and connected by a link, $i^3$, with the armature of the magnet $k$, which is of the solenoid type, giving a comparatively long movement to its armature or the core-pieces that are drawn into the coils.

In order to regulate the time of the intermittent movements of the armature $i^4$ so that the step-by-step movement of the ratchet $h$, and consequent movement of the drum $e$, may be uniform in equal periods of time, the circuit of the said magnet $k$ is controlled by a vibrating governor, shown as a balance, $m$, provided with the usual hair-spring, $m'$, and co-operating with an anchor or escapement-lever, $m^2$, which co-operates with an escape-wheel, $m^3$, that is loose on the actuated shaft $h$ of the clock-train, but is connected with the said shaft by a spring, $m^4$, so that each time the ratchet $h'$ is advanced one step the spring is strained or wound up, tending to cause the escape-wheel to follow in the same direction. The said escape-wheel thus gives the necessary impulse to the pallets of the lever $m^2$ to maintain the vibration of the balance, and the said lever $m^2$ is provided with a circuit-closer, $n$, controlling the circuit of the magnet $k$, and causing the same to be energized and demagnetized at each complete to-and-fro vibration of the lever, and to thus advance the ratchet one step at each such vibration and maintain the force of the spring that acts on the escape-wheel substantially uniform at each vibration. By this construction it will be seen that the power that drives the train of wheel-work and actuating-drum $e$ for the indicating-train is derived from the magnet $k$, which may be sufficient to do the work, be it more or less, while the power that drives the regulator or time-measuring part $m\ m^2\ m^3$ is derived from the spring $m^4$ and does not vary with the amount of work done by the drum $e$. As there is no need of having the clock-movement run except while the current is being used by the translating devices, the circuit of said magnet may be controlled by a circuit-closer, $o\ o'$, controlled by the pointer $d$, as shown in Fig. 1, being opened when the said pointer is in the zero position, or when no current is flowing, but being closed by the movement of said pointer, which occurs when the minimum amount of current is permitted to flow through the translating devices.

In order to insure the proper starting and stopping of the balance $m$, a lever, $p$, is provided having a slender yielding finger, $p'$, which rests against and engages the surface of the balance when the magnet $k$ is demagnetized, the said lever $p$ being controlled by the lever $i'$, by which the ratchet $h'$ is actuated. The said lever $p$ has a projection, $p^2$, that rests over the lever $i$, so that when the latter is moved by the attraction of the magnet $k$ the said lever $p$ is moved and its finger $p'$ swings the balance $m$, so as to start its vibratory movement.

In order to prevent the lever $p$ from interfering with the balance after it is once started and while the clock is running continuously, a support, $p^3$, is provided for said lever, which is retained disengaged from it by the pointer $d$ when in the zero position, but is permitted to drop beneath the said lever $p$ when the pointer moves away from its zero position and the magnet $k$ receives its first impulse, which raises the lever $p$, sets the balance in vibration, and applies the power through the spring $m^4$ to maintain the vibration of the balance. The circuits of the various parts are represented in diagram in Fig. 4, in which 2 and 3 represent the main current-supplying mains or leads, and 4 and 5 the two members of the supplied circuit between which the translating devices T are connected in multiple arc in the usual manner.

The wire $a$ of the current-indicator is included in circuit between one of the main leads, as 2, and one member of the supplied circuit, as 4, so that all the current going to the supplied circuit passes through it.

The magnet $k$ operates in an independent branch between the main leads 2 3, being of high resistance, so that only a small quantity of current is consumed by it. One terminal of said magnet is connected, as shown at 6, with one of the main leads, as 2, and the other terminal of said magnet is connected by conductor 7 with a contact-piece, $t$, insulated from the frame-work of the clock, which is itself connected by conductor 8 with the other main lead, 3.

The spring member $n$ of the circuit-closer that is operated by the time-governor of the clock is in electrical connection with the metallic parts of the clock, and thus, through conductor 8, with the main lead 3, and consequently when the said spring $n$ engages the contact $t$ in the vibration of the governor the circuit 6 7 8 is closed through the magnet $k$, causing the said magnet to be energized, so as to actuate the ratchet $h$, as before stated, and when the spring $n$ moves away from the contact $t$ the circuit is broken, and thus permits the magnet to be demagnetized and its armature retracted, so as to be ready for another movement when the circuit is again closed at the next vibration. When the clock is stopped upon the arrival of the pointer $d$ at the zero position, the balance-starting lever $p$ is permitted to fall and engage the balance, which comes to rest with the parts in position to leave the circuit open between $n$ and $t$, as shown in Fig. 2 and in the diagram, and it is necessary to close the circuit by some other means than the circuit-closer $n$ $t$ when the clock is again to be started. This result is accomplished by the circuit-closer $o$, which is itself insulated from the clock-frame, but is connected by wire 9 to the starting-lever $p$, which is also insulated from the clock-frame, but when the clock is stopped makes contact through the surface of the balance $m$ with the parts of the clock, so that when the circuit-closer $o$ comes into contact with the contact $t$ by the movement of the pointer $d$ from the zero position the circuit will be closed through the magnet $k$ by the conductors 6 7 $t$ $o$ 9 $p$, the clock-frame, and 8, thus energizing the magnet which gives the first impulse to the clock, and at the same time lifts the starting-lever $p$, as before stated, and permits it to be held in its raised position by the prop $p^3$, so that the circuit is no longer closed between the conductors 9 and 8 through the starting-lever $p$ and clock-frame, and the magnet $k$ is left wholly under the control of the circuit-closer $n$ and $t$ until the clock is again stopped by the pointer $d$ coming to the zero position.

It is obvious that the operation of the actuating-drum $e$ and its different projections and the indicating-train $b$ through the intervention of the pointer $d$ as a current-meter is not dependent upon the specific construction of the instrumentality by which said pointer is moved, it being necessary only that the said pointer should respond to changes in quantity of current, so that the number of step advances of the indicating-train in a given period of time should be proportional to the quantity of current flowing during said period.

Several of the sub-combinations of devices entering into the entire apparatus are independent in their operation of the specific construction of the other devices co-operating with them, and the invention so far as relates to such sub-combinations is not limited to the precise construction illustrated and the remaining co-operating parts, as substitutes having the same general relation to such sub-combinations may be employed and would constitute equivalents for the devices shown in connection with such sub-combinations.

I claim—

1. An electric-current indicator composed of two substantially similar and equal wires, each made fast at one end, and one forming a part of the circuit for the current to be measured, combined with a lever connected with the opposite ends of said wires and a tension device connected with the said lever, which is provided with a pointer that is moved by the contraction or expansion of one of said wires relative to the other, substantially as described.

2. A current-measurer comprising a pointer moved to different positions by currents of different quantity, combined with an indicating-train and an actuating-drum having a uniform time movement provided with projections of different length that co-operate with said pointer to give the same indefinite periods of time a number of movements proportional to the quantity of current indicated by said pointer, which actuates the said indicating-train by said movement, substantially as described.

3. The combination of a pointer moved to different positions for currents of different quantity with a train of wheel-work and actuating-magnet therefor, and circuit-closer for said magnet operated by said pointer in going to and leaving its zero position, and a time-measuring regulator actuated by said magnet and spring connecting same with said train of wheel-work, and a circuit-closer for said actuating-magnet controlled by said time-regulator for opening and closing the circuit of said magnet at definite periods of time, substantially as described.

4. The combination of the pointer moved to different positions for currents of different quantity with a train of wheel-work and actuating-magnet therefor, and time-measuring regulator for said wheel-work, provided with a circuit-closer controlling said magnet, a starting-arm for said regulator operated by the armature of said magnet, and a support for said starting-arm operated by said pointer, substantially as described.

5. The combination of the pointer moved to different positions for currents of different quantity with a train of wheel-work and actuating-magnet therefor, and time-measuring regulator for said wheel-work, provided with a circuit-closer controlling said magnet, a starting-arm for said regulator forming a portion of the circuit of said magnet when the regulator is at rest, and a circuit-closer in said circuit through the magnet and starting-arm operated by the said pointer, substantially as described.

In testimony whereof I have signed my name to this specification in the presence of two subscribing witnesses.

HENRY H. CUTLER.

Witnesses:
　　JOS. P. LIVERMORE,
　　M. E. HILL.